US008346876B2

(12) United States Patent
Dennis

(10) Patent No.: US 8,346,876 B2
(45) Date of Patent: Jan. 1, 2013

(54) METHOD AND SYSTEM FOR MESSAGE DELIVERY

(75) Inventor: Paul Stephen Dennis, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/397,210

(22) Filed: Mar. 3, 2009

(65) Prior Publication Data

US 2009/0234928 A1      Sep. 17, 2009

(30) Foreign Application Priority Data

Mar. 3, 2008   (EP) .................................... 08152198

(51) Int. Cl.
*G06F 15/16*   (2006.01)
(52) U.S. Cl. .................... 709/206; 709/204; 709/205
(58) Field of Classification Search .................. 709/206
See application file for complete search history.

(56) References Cited

U.S. PATENT DOCUMENTS

| | | | |
|---|---|---|---|
| 6,336,119 B1 | 1/2002 | Banavar | |
| 2004/0078440 A1* | 4/2004 | Potter et al. .................... | 709/206 |
| 2005/0015619 A1 | 1/2005 | Lee | |
| 2005/0021622 A1* | 1/2005 | Cullen ........................... | 709/204 |
| 2007/0008880 A1* | 1/2007 | Buchko et al. ................. | 370/218 |

FOREIGN PATENT DOCUMENTS

WO   WO 2004/072800   8/2004

OTHER PUBLICATIONS

Fox, et al., "A Scalable Durable Event Service", Technical Report, Community Grids Lab, pp. 1-11, 2001.
Mustacoglu, et al., "A Novel Event-Based Consistency Model for Supporting Collaborative Cyberinfrastructure Based Scientific Research", Collaborative Technologies and Systems.
Szarowski, Roman, "Hybrid Publish-Subscribe: A Compromise Appraoch for Large-Scale", CAISE Conference, Jun. 16, 2003.

* cited by examiner

*Primary Examiner* — Kenny Lin
*Assistant Examiner* — Shaq Taha
(74) *Attorney, Agent, or Firm* — Novak Druce + Quigg LLP

(57) ABSTRACT

The present invention is directed to an apparatus, system, methods, and computer-program product for message delivery in a publish/subscribe network is provided. According to one embodiment of the invention, a method for message delivery in a publish/subscribe network includes defining a group of publish/subscribe engines as a subset of a set of fully connectable publish/subscribe engines, wherein the group provides a function which can be carried out by any one of the publish/subscribe engines in the group. Each of the publish/subscribe engines in the group sends a group proxy subscription including a topic, an indication of the publish/subscribe engine sending the group proxy subscription, and an indication of the group. A publish/subscribe engine outside the group sends a single publish message to one of the group of publish/subscribe engines with a group proxy subscription for a topic. If the one of the group of publish/subscribe engines to which the single publish message is being sent also has an individual proxy subscription, the publish message for the group is included in the publish message for the individual proxy subscription.

25 Claims, 5 Drawing Sheets

METHOD AND SYSTEM FOR MESSAGE DELIVERY

CROSS-REFERENCE TO RELATED APPLICATION

This application claims the benefit of European Patent Application 08152198.1, filed on Mar. 3, 2008, which is hereby incorporated by reference.

FIELD OF THE INVENTION

The present invention generally relates to the field of message delivery and, more specifically to message delivery in a publish/subscribe network in which publish/subscribe engines are grouped to provide specific functionality.

BACKGROUND OF THE INVENTION

In a publish/subscribe network a common technique is for each publish/subscribe engine in the network to send out proxy subscriptions for the topics that it actually has subscribers on. This proxy subscription informs the other publish/subscribe engines in the collective (a group of fully connected publish/subscribe engines) that if they receive a publication for the topic then they should forward it onto the publish/subscribe engine that sent out the proxy subscription. This reduces the network traffic as only a single publication needs to be sent to the publish/subscribe engine, which is then fanned out to all the local subscribers.

Proxy subscriptions are sent between publish/subscribe engines, so each publish/subscribe engine knows each other publish/subscribe engine's set of subscriptions and hence knows where to forward each publication according to its topic, avoiding the need to send all publications to all publish/subscribe engines. In conventional publish/subscribe networks, the topology does not assume any distinction between different publish/subscribe engines—all are equal and each publish/subscribe engine may wish to connect to any other—and so the propagation of proxy subscription information is either hierarchical (for a hierarchical publish/subscribe engine topology) or multicast to all publish/subscribe engines.

The technique of using collectives and proxy subscriptions does not enable groups of publish/subscribe engines to be defined inside a collective. A group of publish/subscribe engines may wish to serve a common goal. This goal might be delivering messages to subscribers that have a destination which can be directly accessed by any of the publish/subscribe engines in the group, for example, on a shared queue. An alternative might be if two publish/subscribe engines are desired to link between two collectives, but normally this would still create duplicates as each one would receive the publications and attempt to forward on to the other collective.

SUMMARY OF THE INVENTION

The present invention is directed to an apparatus, system, methods, and computer-program product for message delivery in a publish/subscribe network.

In one embodiment of the invention, the method can include defining a group of publish/subscribe engines as a subset of a set of fully connected publish/subscribe engines, wherein the group provides a function which can be carried out by any one of the publish/subscribe engines in the group; each of the publish/subscribe engines in the group sending a group proxy subscription, the group proxy subscription including a topic, an indication of the publish/subscribe engine sending the group proxy subscription, and an indication of the group.

According to a second aspect the method can include receiving a group proxy subscription from each one of a group of publish/subscribe engines, wherein the group proxy subscription includes a topic, an indication of the publish/subscribe engine sending the group proxy subscription, and an indication of the group; receiving a publish message for the topic defined in the group proxy subscription; and forwarding the publish message to one of the publish/subscribe engines in the group.

According to a third aspect of the present invention there is provided a computer program product stored on a computer readable storage medium for message delivery, comprising computer readable program code means for performing the steps of: defining a group of publish/subscribe engines as a subset of a set of fully connected publish/subscribe engines, wherein the group provides a function which can be carried out by any one of the publish/subscribe engines in the group; each of the publish/subscribe engines in the group sending a group proxy subscription, the group proxy subscription including a topic, an indication of the publish/subscribe engine sending the group proxy subscription, and an indication of the group.

According to a fourth aspect of the present invention there is provided a computer program product stored on a computer readable storage medium for message delivery, comprising computer readable program code means for performing the steps of: receiving a group proxy subscription from each one of a group of publish/subscribe engines, wherein the group proxy subscription includes a topic, an indication of the publish/subscribe engine sending the group proxy subscription, and an indication of the group; receiving a publish message for the topic defined in the group proxy subscription; and forwarding the publish message to one of the publish/subscribe engines in the group.

According to a fifth aspect of the present invention, the system for message delivery in a publish/subscribe network can include a plurality of publish/subscribe engines defined as a group, the plurality of publish/subscribe engines being a subset of a set of fully connected publish/subscribe engines, and wherein the group provides a function which can be carried out by any one of the publish/subscribe engines in the group; each of the publish/subscribe engines in the group including: means for sending a group proxy subscription, the group proxy subscription including a topic, an indication of the publish/subscribe engine sending the group proxy subscription, and an indication of the group.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

Figure 1:
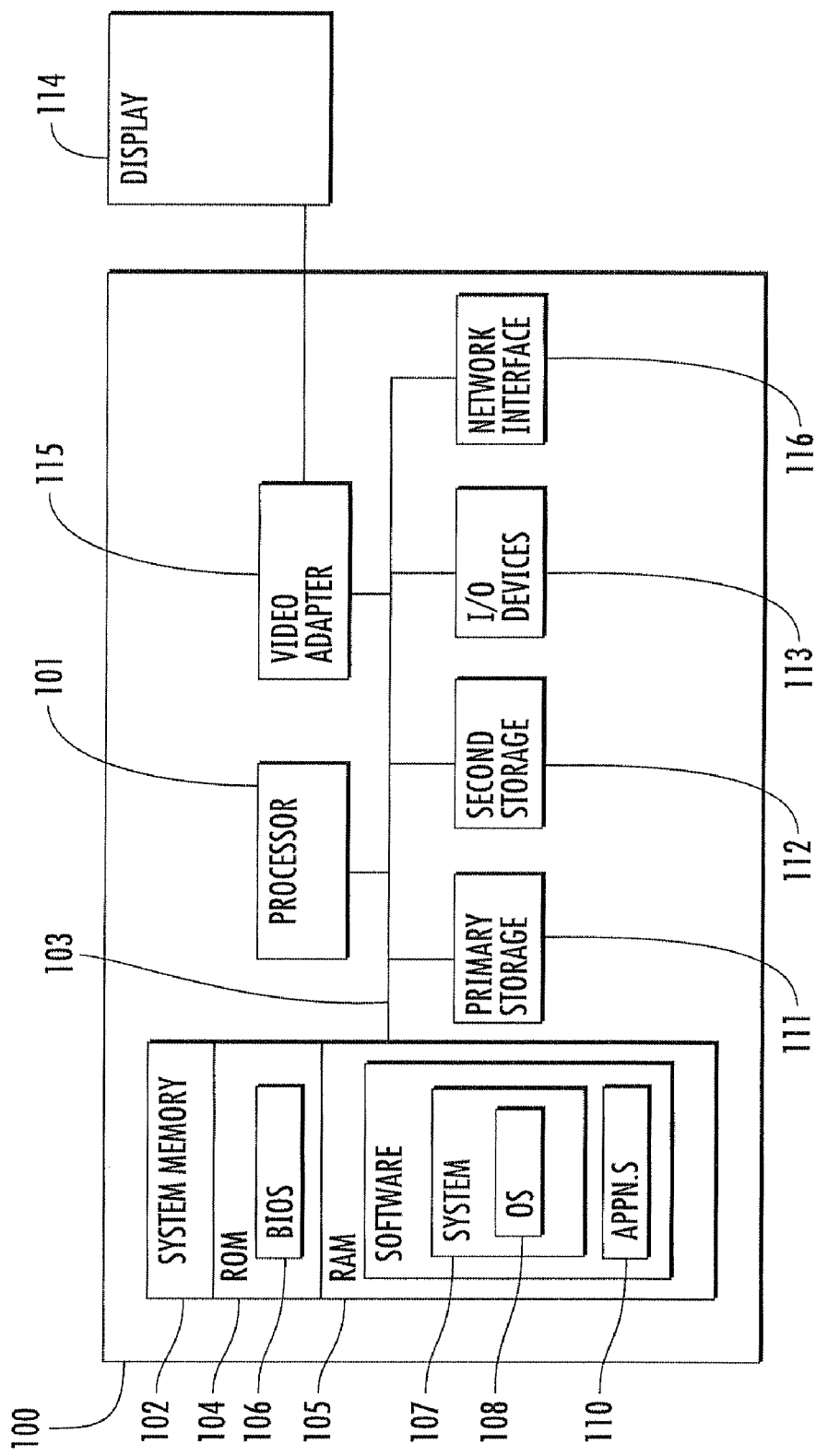
FIG. 1 is a block diagram of a computer system in which the present invention may be implemented.

This invention enables groups of publish/subscribe engines to be defined inside a collective, which have a specific functionality and where typically it would be desirable for a single one of these publish/subscribe engines to carry out the action. This is achieved at the same time as the publish/subscribe engines performing normal publish/subscribe work like any other publish/subscribe engine in the collective.

The solution proposed protects against duplicate messages being created, whilst at the same time ensuring that a member of the group will receive the publication in a timely manner so that the group functionality may be satisfied.

Embodiments of the present invention provide an apparatus, system, method, and computer-program product for message delivery in a publish/subscribe network. A publish/subscribe application is intended for situations where a single message is required by, and should be distributed to, multiple users. The advantage over other delivery methods is that the publisher is kept separated from the subscriber. This means that the publisher in a publish/subscribe application does not need to have any knowledge of either the subscriber's existence or the applications that may use the published information. Likewise, the subscriber or subscriber applications do not need to know anything about the publisher application.

A publish/subscribe application has one or more publishers who publish messages from an application to a publish/subscribe engine, and a group of subscribers who subscribe to some or all of those published messages that are held on the publish/subscribe engine. The system matches the publications to the subscribers and ensures that all the messages are made available and delivered to all the subscribers in a timely manner.

Geographically distributed systems or requirements for heavy workloads can be accommodated by a network of publish/subscribe engines having two-way connectivity among them.

Publish/subscribe engines can be linked to form a hierarchy, and publications and subscriptions can flow from any publish/subscribe engine to any other publish/subscribe engine in the hierarchy. As well as the hierarchy topology, another topology type is supported, called a collective.

A collective is a set of publish/subscribe engines in which the publish/subscribe engines (for example, in the form of brokers or queue managers) are totally connected. That is, every publish/subscribe engine is directly connected to every other publish/subscribe engine. Communication between publish/subscribe engines is optimized within this type of topology and collectives may be connected to other stand-alone publish/subscribe engines or collectives in a large topology.

In a publish/subscribe network, each publish/subscribe engine in the network can send out proxy subscriptions for the topics that it actually has subscribers on. This proxy subscription informs the other publish/subscribe engines in the collective of the publish/subscribe engine's subscriber's topic. If another publish/subscribe engine receives a publication for one of these topics then it should forward it to the publish/subscribe engine that sent out the proxy subscription. This reduces the network traffic as only a single publication needs to be sent to the publish/subscribe engine, which is then fanned out to all the local subscribers.

Proxy subscriptions are sent between publish/subscribe engines, so each publish/subscribe engine knows each other publish/subscribe engine's set of subscriptions and hence knows where to forward each publication according to its topic, avoiding the need to send all publications to all publish/subscribe engines.

A method of using collectives and proxy subscriptions is provided to enable groups of publish/subscribe engines to be defined inside a collective. A group of publish/subscribe engines may wish to serve a common goal or carry out a function. In one example, this goal might be delivering messages to subscribers that have a destination which can be directly accessed by any of the publish/subscribe engines in the group, for example, on a shared queue. In another example, an alternative goal might be if two or more of the publish/subscribe engines are linked between two collectives. Other functions or goals can equally be provided by a group.

Referring to FIG. 1, an exemplary system for implementing a publish/subscribe engine includes a data processing system 100 suitable for storing and/or executing program code including at least one processor 101 coupled directly or indirectly to memory elements through a bus system 103. The memory elements can include local memory employed during actual execution of the program code, bulk storage, and cache memories which provide temporary storage of at least some program code in order to reduce the number of times code must be retrieved from bulk storage during execution.

The memory elements may include system memory 102 in the form of read only memory (ROM) 104 and random access memory (RAM) 105. A basic input/output system (BIOS) 106 may be stored in ROM 104. System software 107 may be stored in RAM 105 including operating system software 108. Software applications 110 may also be stored in RAM 105.

The system 100 may also include a primary storage means 111 such as a magnetic hard disk drive and secondary storage means 112 such as a magnetic disc drive and an optical disc drive. The drives and their associated computer-readable media provide non-volatile storage of computer-executable instructions, data structures, program modules and other data for the system 100. Software applications may be stored on the primary and secondary storage means 111, 112 as well as the system memory 102.

The computing system 100 may operate in a networked environment using logical connections to one or more remote computers via a network adapter 116.

Input/output devices 113 can be coupled to the system either directly or through intervening I/O controllers. A user may enter commands and information into the system 100 through input devices such as a keyboard, pointing device, or other input devices (for example, microphone, joy stick, game pad, satellite dish, scanner, or the like). Output devices may include speakers, printers, etc. A display device 114 is also connected to system bus 103 via an interface, such as video adapter 115.

Two example embodiments are used to illustrate the described system showing different functions of groups. It should be understood that the described method and system are not limited to the example functions of the groups, but may be applied to groups carrying out any group function.

Figure 2:
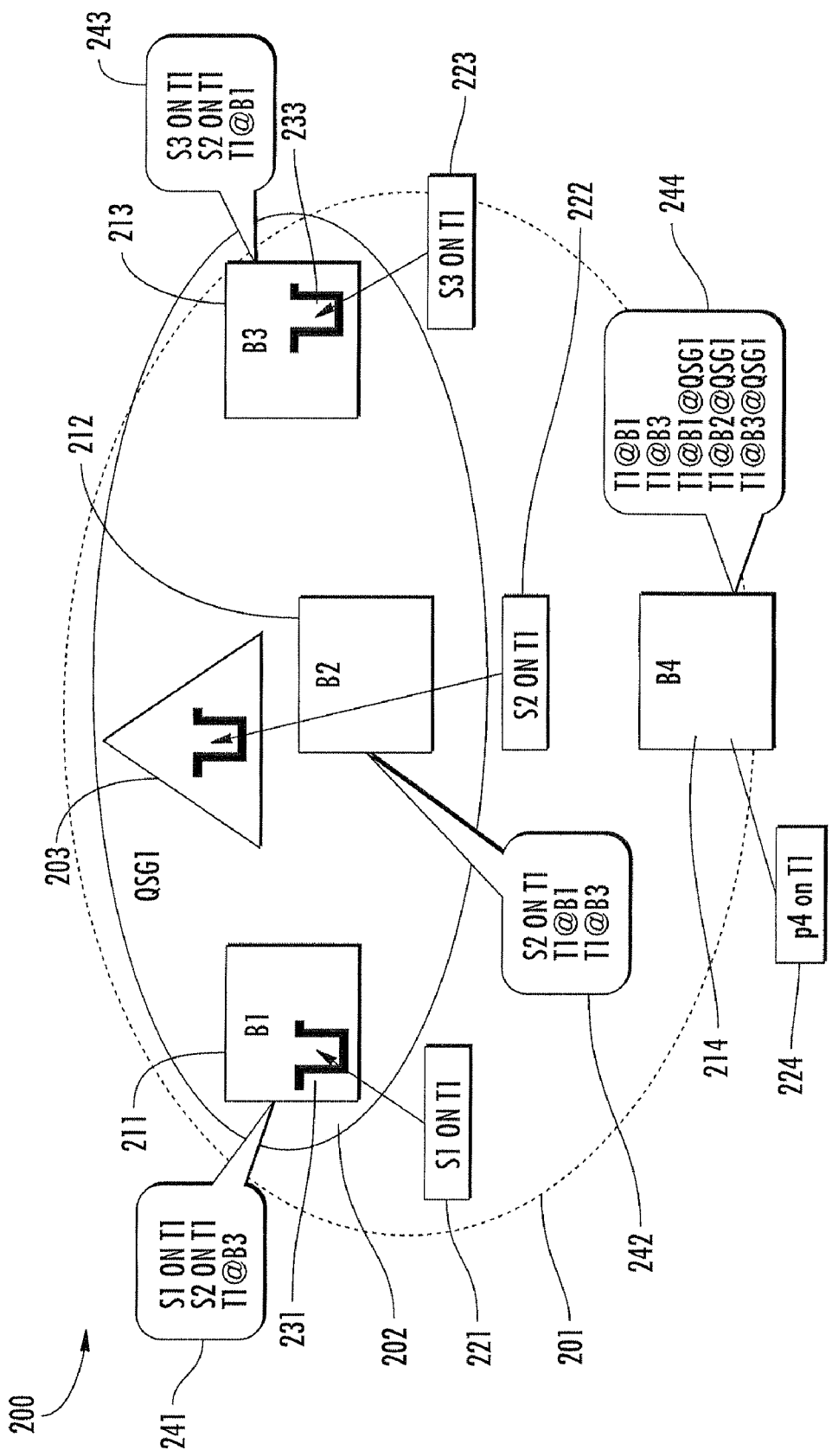
FIG. 2 is a block diagram of a first embodiment of a publish/subscribe system in accordance with the present invention.

A first embodiment of the described system is provided with reference to FIG. 2. FIG. 2 shows an example publish/ subscribe network 200 with a collective 201 of four publish/subscribe engines (B1, B2, B3, B4) 211, 212, 213, 214. For example, the publish/subscribe engines may be queue managers. In this example, a group within the collective 201 is defined in the form of a queue sharing group (QSG1) 202 with a shared queue 203. The queue sharing group 202 includes three of the publish/subscribe engines (B1, B2, B3) 211, 212, 213.

In this first embodiment of the described system, the case is considered in which the destination of the publications for a particular subscriber is the shared queue 203.

There are two forms of proxy subscription that are used in the described systems. The first one is the standard proxy subscription that is sent from a publish/subscribe engine that details the topic that the proxy is for and the publish/subscribe engine that is interested in it. This is referred to as an "individual proxy subscription" in order to distinguish it from the second type of proxy subscription. The second type of proxy is similar, but is qualified with a group name as well. This second type is referred to as a "group proxy subscription".

These proxies are represented as "T1@B1" for an individual proxy subscription (referring to a specified topic at a specified publish/subscribe engine) and "T1@B1@GRP1" for a group proxy subscription (referring to a specified topic at a specified publish/subscribe engine at a specified group).

The description of the processing that takes place can be divided into two parts: one for inside (associated with) a group (in this example the queue sharing group 202); and one for outside (not associated with) a group. These two parts can be understood independently; those outside the group are not concerned with what the group is doing; they just have to send the group the correct number and type of publications. FIG. 2 is used to explain how the proxy subscriptions are used by those inside the group and those outside the group.

The publish/subscribe engine B4 214 can become aware that the publish/subscribe engines B1-B3, 211-213 are in merely in a group without knowing what that actual group does. In this example, the publish/subscribe engine B4 214 does not know that the publish/subscribe engines B1-B3, 211-213 of the group are part of a queue sharing group 202.

Starting with publish/subscribe engine B2 212, a subscriber S2 222 is connected to publish/subscribe engine B2 212 and has subscribed to topic T1 and the destination is the shared queue 203. As the subscriber S2 222 is using a shared queue 203, publish/subscribe engine B2 212 will send the full subscription (not a proxy) to the other publish/subscribe engines B1 211 and B3 213 in the queue sharing group 202. This means that the publish/subscribe engines B1 211 and B3 213 also have a full subscription for the subscriber S2 222.

For the publish/subscribe engine B1 211, a subscriber S1 221 has subscribed to topic T1 with a private destination, for example, a local queue 231. The publish/subscribe engine B1 211 will ensure that the other publish/subscribe engines B2 212, B3 213 in the queue sharing group 202 have a proxy subscription, so they know the requirement to send the publish/subscribe engine B1 211 any publications on topic T1.

Similarly, publish/subscribe engine B3 213 also has a private subscriber S3 223 on topic T1 with a destination of a private destination in the form of local queue 233. The publish/subscribe engine B3 213 sends out a proxy subscription for this topic.

The subscriptions at each of the publish/subscribe engines B1-B4 211-214 are shown in callouts 241-244.

The callout 241 for publish/subscribe engine B1 211 has the following subscriptions: "S1 on T1" denotes the full subscription for its local subscriber S1 221; "S2 on T1" denotes the full subscription of S2 222 on the shared queue 203; and "T1@B3" denotes the proxy subscription from publish/subscribe engine B3 213 for subscriber S3 223 with the local destination queue 233 on publish/subscribe engine B3 213.

The callout 242 for publish/subscribe engine B2 212 has the following subscriptions: "S2 on T1" denotes for the full subscription of subscriber S2 222 on the shared queue 203; "T1@B1" denotes the proxy subscription from publish/subscribe engine B1 211 for subscriber S1 221 with the local destination queue 231 on publish/subscribe engine B3 211; and "T1@B3" denotes the proxy subscription for from publish/subscribe engine B3 213 for subscriber S3 223 with the local destination queue 233 on publish/subscribe engine B3 213.

The callout 243 for publish/subscribe engine B3 213 has the following subscriptions: "S3 on T1" denotes the full subscription for its local subscriber S3 223; "S2 on T1" denotes the full subscription of subscriber S2 222 on the shared queue 203; "T1@B1" denotes the proxy subscription from publish/subscribe engine B1 211 for subscriber S1 221 with the local destination queue 231 on publish/subscribe engine B1 211.

The callout 244 for publish/subscribe engine B4 214 has the following subscriptions: "T1@B1" denotes the individual proxy subscription from publish/subscribe engine B1 211 for subscriber S1 221 with the local destination queue 231 on publish/subscribe engine B1 211; "T1@B3" denotes the individual proxy subscription from publish/subscribe engine B3 213 for subscriber S3 223 with the local destination queue 233 on publish/subscribe engine B3 213; "T1@B1@QSG1" denotes the group proxy subscription from publish/subscribe engine B1 211 for the shared subscribers with the destination of the shared queue 203; "T1@B2@QSG1" denotes the group proxy subscription from publish/subscribe engine B2 212 for the shared subscribers with the destination of the shared queue 203; and "T1@B3@QSG1" denotes the group proxy subscription from publish/subscribe engine B3 213 for the shared subscribers with the destination of the shared queue 203.

Looking at the subscriptions on publish/subscribe engine B4 214, there is an individual proxy subscription from publish/subscribe engine B1 214 for topic T1 and also from publish/subscribe engine B3 213 for the same topic T1. In addition, there are a number of group proxy subscriptions of the form TOPIC@QMGR@GROUP which are due to the shared subscriber S2 222. Each publish/subscribe engine B1-B3 211-213 in the queue sharing group 202 will send out a group proxy subscription for the shared subscribers independently of their private subscribers, and also independently of the other publish/subscribe engines in the queue sharing group 202. This mean that because there are three publish/subscribe engines B1-B3 211-213 in the queue sharing group 203 there are three group proxy subscriptions at publish/subscribe engine B4 214, one from each of publish/subscribe engines B1-B3. The publish/subscribe engines B1-B3 211-213 in the queue sharing group 203 do not send these proxy subscriptions to the other publish/subscribe engines in the queue sharing group 203 since they already have full subscriptions.

Firstly, the process outside the group is considered. A publisher P4 224 on publish/subscribe engine B4 214 publishes for topic T1. There will be two publications that are sent out from publish/subscribe engine B4 214 to satisfy the proxy subscriptions shown in the callout 244.

Following the normal rules for proxy subscriptions, where the publish/subscribe engine B4 214 on which the initial publication is occurring will forward the publication to the other publish/subscribe engines that have provided a proxy subscription. In this case, a publish message will be sent to both publish/subscribe engine B1 211 and publish/subscribe engine B3 213 to satisfy the individual proxy subscriptions of "T1@B1" and "T1@B3".

When these publications are sent to the publish/subscribe engines B1 211 and B3 213 to satisfy the individual proxy subscriptions, the destination of the publication will be identified. So for publish/subscribe engine B1 211 the message will identify that it is to satisfy the subscription on publish/subscribe engine B1 211 and similarly for publish/subscribe engine B3.

In addition, one of these messages will also be identified as being destined for the queue sharing group QSG1 202. The message that is sent to publish/subscribe engine B1 211 performs this action. The message sent to publish/subscribe engine B3 213 will be identified as having a destination of publish/subscribe engine B3 213 only, whereas the message sent to publish/subscribe engine B1 211 will be identified as being destined for both publish/subscribe engine B1 211 and queue sharing group QSG1 202. Only a single message needs to be sent to satisfy the whole of the queue sharing group QSG1 202, so although there are three group proxy subscriptions from the queue sharing group QSG1 202, only one message is required, which can actually be combined with satisfying the private workload of one of the members of the group.

Secondly, the process inside the group is considered. Publish/subscribe engine B1 211 will receive a publication from publish/subscribe engine B4 214 that is identified as being for publish/subscribe engine B1 211 and queue sharing group QSG1 202. Publish/subscribe engine B1 211 will therefore satisfy its private subscribers with this publication and also the shared subscribers (that is the functionality of the group). Publish/subscribe engine B3 213 will receive a publication destined for just publish/subscribe engine B3 213 and will therefore only satisfy its private subscribers.

As has already been stated, the publish/subscribe engines outside a group do not need to know what the group is going to do with the publications. The publish/subscribe engines outside the group follow the following rules: The engines can send a publication for each of the normal proxy subscriptions and also mark one of these as being for the group; The engines can send a publication for each of the normal proxy subscriptions and a separate publication for the group as a separate message, to one of the publish/subscribe engines in the group; or if there are no normal proxy subscriptions for the group, the engines can send a unique message to one of the group. Thus, it is possible to create other groups that carry out a different function, without needing to change the publish/subscribe engines outside the group.

Figure 3:
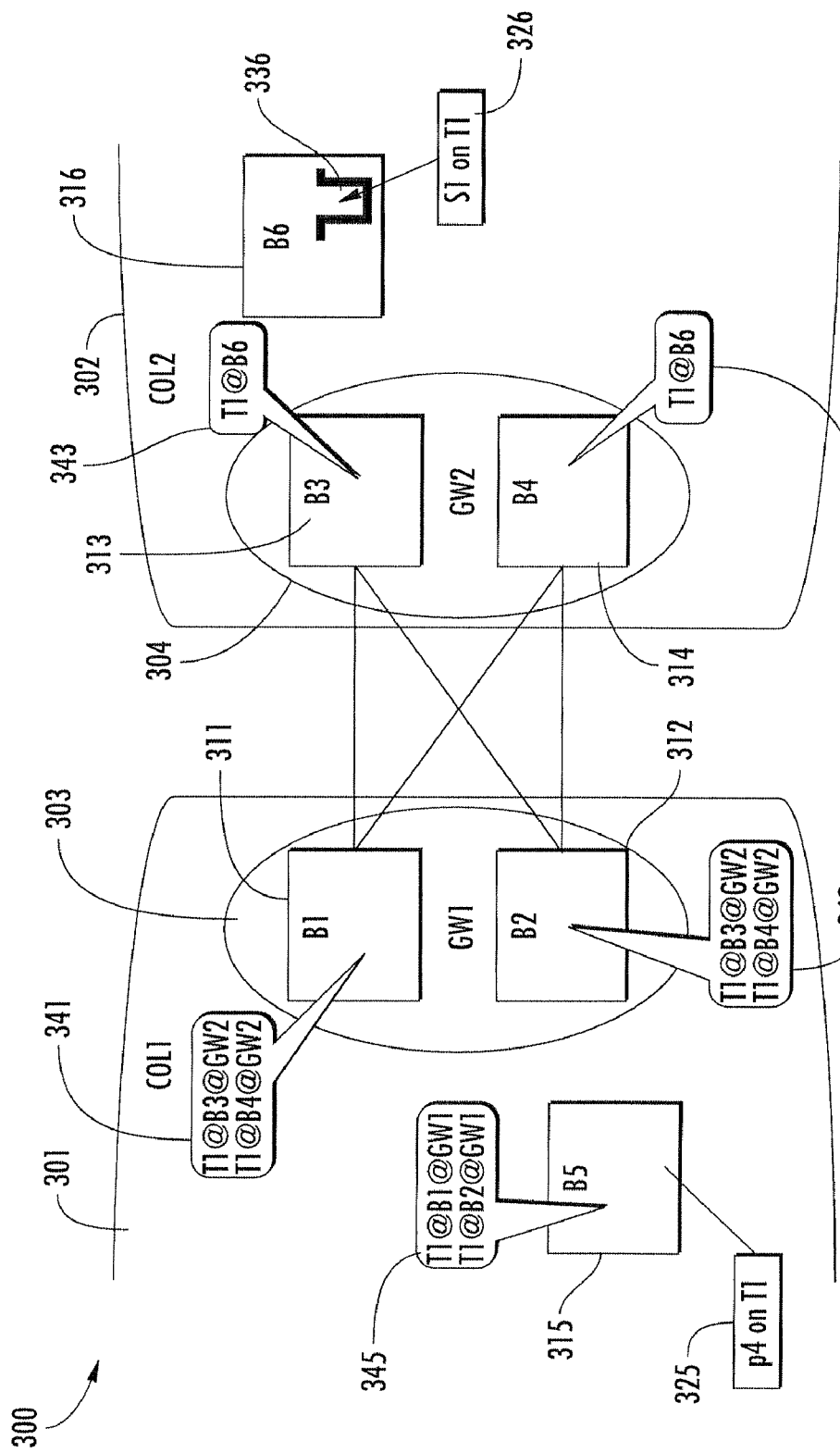
FIG. 3 is a block diagram of a second embodiment of a publish/subscribe system in accordance with the present invention.

A second embodiment of the described system is provided with reference to FIG. 3 in which a group with functionality is a group that is used as a gateway between two collectives. Normally, it would only be possible to have a single link, due to the fact that duplicate messages would be created if there was more than one link. Using the described method it is possible to create a group that provides higher availability between collectives, while not risking duplicates being created. FIG. 3 is used to explain how a group that can provide higher availability between collectives works.

Referring to FIG. 3, a publish/subscribe environment 300 is shown having two collectives, COL1 301 and COL2 302.

The first collective COL1 301 has three publish/subscribe engines B1 311, B2 312, B5 315. Two of the publish/subscribe engines B1 311, B2 312 of the first collective COL1 301 are in a gateway group GW1 303.

The second collective COL2 302 has three publish/subscribe engines B3 313, B4 314, B6 316. Two of the publish/subscribe engines B3 313, B4 314 of the second collective COL2 302 are in a gateway group GW2 304.

In the second collective COL2 302 there is a subscriber S1 326 on publish/subscribe engine B6 306. It is assumed that a publisher P4 325 is on publish/subscribe engine B5 315 in the first collective COL1 301. The following describes how, using proxy subscriptions, the publication is delivered to subscriber S1 326.

Before looking at the publication, the proxy subscriptions that have been created are considered. The proxy subscriptions at each of the publish/subscribe engines B1-B6 311-316 are shown in callouts 342-346.

As publish/subscribe engine B3 313 and publish/subscribe engine B4 314 are in the same collective as publish/subscribe engine B6 316, they will have both received a proxy subscription "T1@B6" from publish/subscribe engine B6 316 for topic T1. This is shown in the callouts 343, 344 for publish/subscribe engines B3 313 and B4 314. As both publish/subscribe engines B3 313 and B4 314 belong to a Gateway Group GW2 304, they will both send group proxy subscriptions to the publish/subscribe engine gateways in the other collective. In this example, there are two gateway publish/subscribe engines B1 311, B2 312 in the other collective 301 which also form a different Gateway Group 303. The design would equally work with a single publish/subscribe engine on the other side.

Publish/subscribe engines B1 311 and B2 312 both receive group proxy subscriptions from publish/subscribe engines B3 313 and B4 314. Because publish/subscribe engines B3 313 and B4 314 are in a group they can send group proxy subscriptions, hence publish/subscribe engines B1 311 and B2 312 have proxy subscriptions of "T1@B3@GW2" and "T1@B4@GW2" shown in their callouts 341, 342.

Publish/subscribe engines B1 311 and B2 312 will then send out group proxy subscriptions to the other publish/subscribe engines in the first collective COL1 301, but not to those in the same group as themselves. Therefore publish/subscribe engine B5 315 will receive group proxy subscriptions from publish/subscribe engines B1 311 and B2 312 resulting in the group proxy subscriptions of "T1@B1@GW1" and "T1@B2@GW1" in the callout 345 for publish/subscribe engine B5 315.

When a publication occurs at publish/subscribe engine B5 315 on topic T1, the publish/subscribe engine B5 315 can look at the proxy subscriptions 345 ("T1@B1@GW1" and "T1@B2@GW1") that it has. If they are group proxy subscriptions, publish/subscribe engine B5 315 will send a single message to either publish/subscribe engines B1 312 or B2 322, indicating that it is for gateway group GW1 303.

By default, it may be assumed that the message is for publish/subscribe engine B2 312. Publish/subscribe engine B2 312 can identify that the publication is meant for gateway group GW1 303 and because of the group proxy subscriptions ("T1@B3@GW2" and "T1@B4@GW2"), and the type of group, B2 312 will end up sending the message to either publish/subscribe engines B3 313 or B4 314.

Similarly, publish/subscribe engine B3 313 will see that the message is destined for gateway group GW2 304, but because it is coming from the partner gateway GW1 303 it will send the publication out according to the proxy subscriptions that it has ("T1@B6"). In this case, the message will be sent only to B6 316, and not back to gateway group GW1 303.

In this way it is possible to have a highly available link between two collectives 301, 302 without risking duplicate messages, or being reliant on any particular gateway publish/subscribe engine. The gateway between the collectives will still function if a single publish/subscribe engine in one (or both) of the gateway groups fails. The design is not limited to just two publish/subscribe engines in each gateway group; more publish/subscribe engines could be added to the groups to provide an even higher level of availability.

Figure 4:
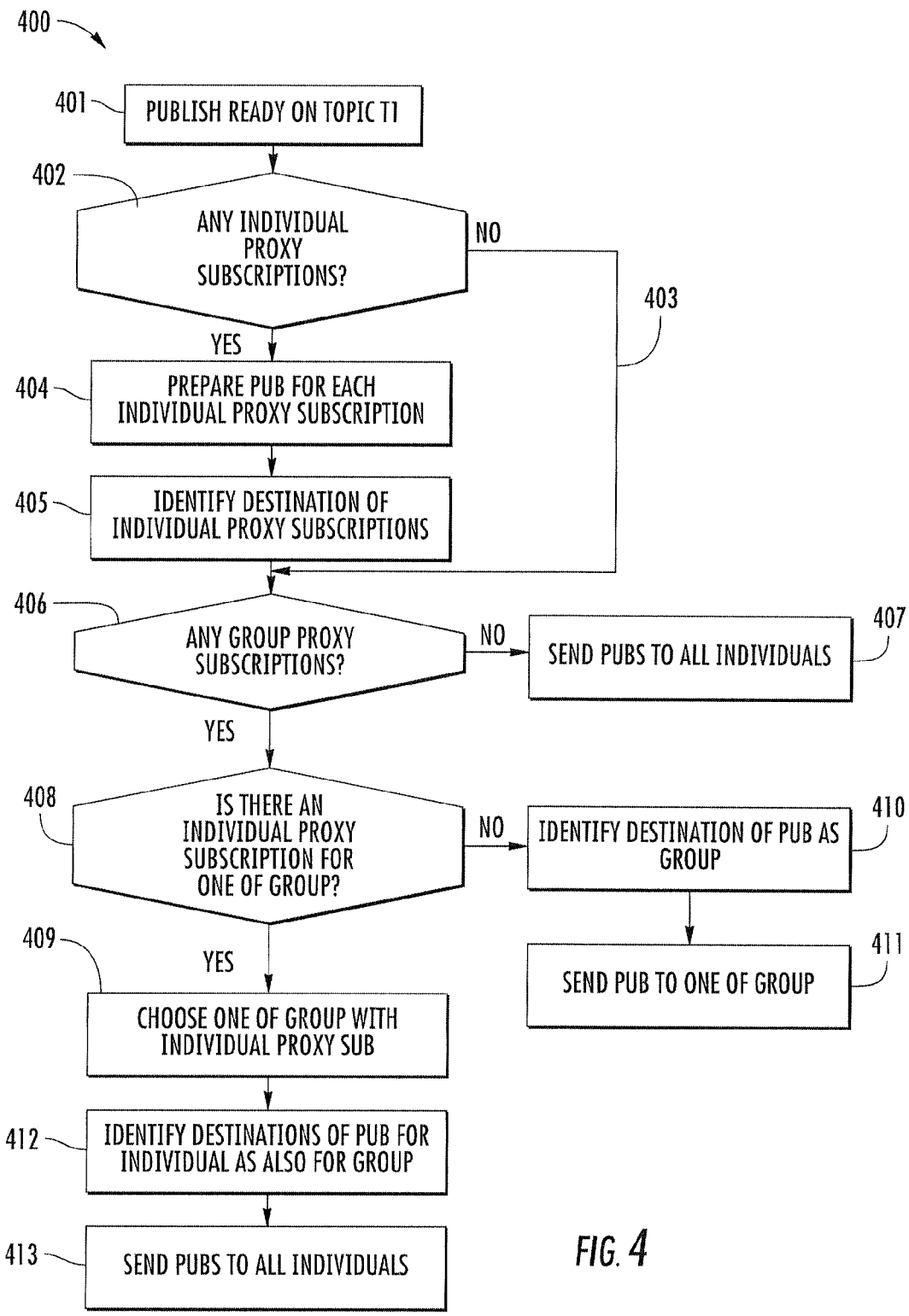
FIG. 4 is a flow chart of a process carried out inside a group in accordance with an aspect of the present invention.

Referring to FIG. 4 a flow diagram 400 shows the described process from the perspective of a publication outside a group. Beginning at step 401, a publication is ready on topic Ti at a publish/subscribe engine. It is determined in decision step 402 if there are any individual proxy subscriptions on the topic. If not, the process loops step 403 to later in the process, prior to step 406. If there are individual proxy subscriptions on the topic, a publication is prepared in step 404 for each individual proxy subscription on the topic. The destination publish/subscribe engine is identified in step 405 in the publication for each of the individual proxy subscriptions.

It is then determined decision step 406 if there are any group proxy subscriptions. If not, the prepared publications for the individual proxy subscriptions are sent in step 407.

If there are group proxy subscriptions, it is determined if there is an individual proxy subscription for one of the publish/subscribe engines in the group in decision step 408. If so, one of the publish/subscribe engines with an individual proxy subscription is chosen in step 409. If not, a group destination is identified 410 in the publication and the publication is sent in step 411 to the chosen publish/subscribe engine.

If there is an individual proxy subscription for a publish/subscribe engine in the group, identify in step 412 the previously prepared publication for this publish/subscribe engine as also being for the group. In step 413, the publication is sent to all individual proxy publish/subscribe engines.

As an alternative, two publications may be sent to the same publish/subscribe engine, one as a publication destined to a distinct publish/subscribe engine and a separate publish for the group as separate message.

Figure 5:
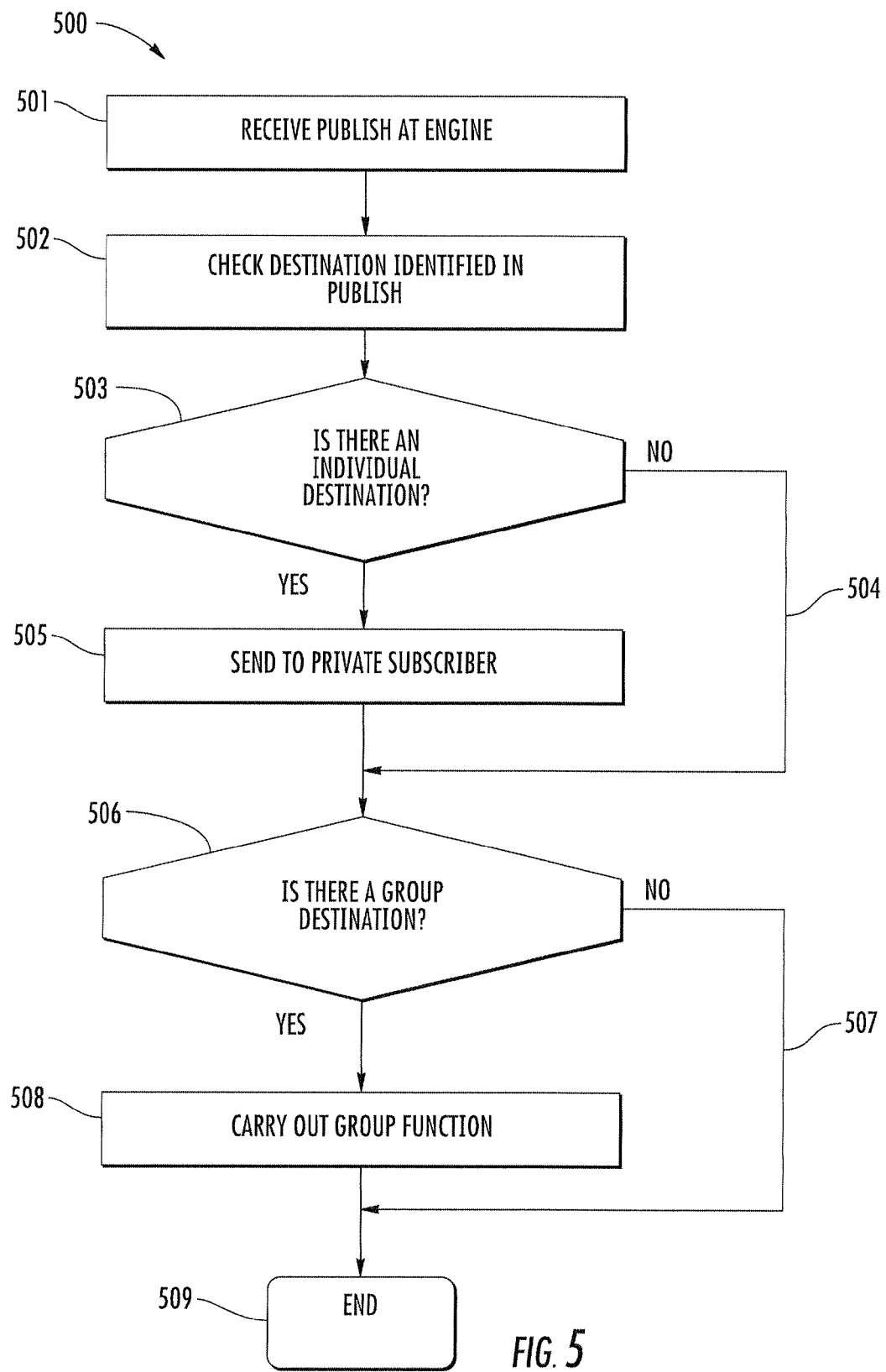
FIG. 5 is a flow chart of a process carried out outside a group in accordance with an aspect of the present invention.

Referring to FIG. 5, a flow diagram 500 shows the described process from the perspective of a received publication inside a group. Beginning at step 501, publication is received at a publish/subscribe engine. The destination identified in the publication is checked in step 502. It is determined in decision step 503 if there is an individual destination. If not, the process loops to step 504. If there is an individual destination, the publication is sent in step 505 to the private subscriber on the publish/subscribe engine.

It is then determined in step 506 if there is a group destination. If not, the process loops to step 507. If there is a group destination, then the publish/subscribe engine carries out in step 508 the functionality of the group. The process then ends in step 509.

Any publish/subscribe engine outside the group that is sending a publication to a member of the group does not need to know what the group is going to do with the publication. This enables new groups to be created that have specific functionality without having to change all of the other publish/subscribe engines in the collective.

The described process groups a subset of the publish/subscribe engines together to provide some specific functionality (a common goal) while still performing conventional publish/subscribe operations. This builds on the recognition that there are occasions where different publish/subscribe engines should have different roles within the network. The described process implements different types of propagation of proxy subscription within a single network (i.e. some "group proxy subscriptions" are used as well as standard proxy subscriptions). Different processing is performed inside the group compared with outside the group, to make best use of shared queues within a group of publish/subscribe engines.

The present invention may further be implemented as a computer program product used by, for example the computer system shown in FIG. 1, which may contain codes for implementing a message delivery method in a publish/subscribe network according to the present invention and codes for implementing message delivery apparatus in a publish/subscribe network according to the present invention. The code may be stored in a memory of other computer system prior to the usage. For instance, the code may be stored in a hard disk or a removable memory like an optical disk or a floppy disk, or may be downloaded via the Internet or other computer network.

The disclosed method of the present invention may be implemented in a combination of software and hardware. The hardware part may be implemented using a dedicated logic, and the software part may be stored in a memory and be implemented by a proper instruction implementing system, such as a microprocessor, a personal computer (PC) or a mainframe.

The invention can take the form of an entirely hardware embodiment, an entirely software embodiment or an embodiment containing both hardware and software elements. In an embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadcast interpretation so as to encompass all such modifications and equivalent structures and functions.

I claim:

1. A method for message delivery in a publish/subscribe network, comprising:

defining a group of publish/subscribe engines, wherein the group is a subset of a set of fully connectable publish/subscribe engines, wherein the group provides a function which can be carried out by any one of the publish/subscribe engines associated with the group;

each of the publish/subscribe engines associated with the group sending a group proxy subscription to the publish/subscribe engines not associated with the group, the group proxy subscription comprising a topic, an indication of the publish/subscribe engine sending the group proxy subscription, and an indication of the group;

each of the publish/subscribe engines associated with the group sending an individual proxy subscription to the set of publish/subscribe engines, the individual subscription comprising a topic and an indication of the publish/subscribe engines sending the individual proxy subscription and excluding the indication of the group; and wherein the group of publish/subscribe engines comprises a gateway group within a first collective for connection to a second collective, and the function comprises linking the first and second collectives.

2. The method of claim 1, wherein responsive to a publish/subscribe engine not associated with the group sending a publish message for a topic to one of the group of publish/subscribe engines in response to one of an individual proxy subscription for the topic and a group proxy subscription for a topic, the one of the group of publish/subscribe engines carrying out the function with respect to private subscribers of the one of the group of publish/subscribe engines.

3. The method of claim 2, wherein, responsive to the publish message being in response to the group proxy subscription, forwarding the publish message to the other ones of the group of publish/subscribe engines associated with an individual proxy subscription for the topic at the one of the group of publish/subscribe engines.

4. The method of claim 2, wherein the publish message identifies a destination of one of: an individual publish/subscribe engine, a group of publish/subscribe engines, or both an individual publish/subscribe engine and a group of publish/subscribe engines.

5. The method of claim 2, wherein the group of publish/subscribe engines comprises a queue sharing group with a shared queue within a collective, and wherein responsive to the publish message being in response to the group subscription for the topic, sending the publish message to the shared queue.

6. The method of claim 1, wherein an individual proxy subscription is sent from a publish/subscribe engine to other publish/subscribe engines to inform the other publish/subscribe engines that if they receive a publish message for the topic associated with the individual proxy subscription, they should forward it to the publish/subscribe engine sending the individual proxy subscription.

7. The method of claim 1, wherein a group proxy subscription is sent from each one of a group of publish/subscribe engines to publish/subscribe engines not associated with the group, to inform the publish/subscribe engines not associated with the group that if they receive a publish message for the topic associated with the proxy subscription, they should forward it to one of the publish/subscribe engines associated with group.

8. A method for message delivery in a publish/subscribe network, comprising:
providing a set of frilly connectable publish/subscribe engines, the set comprising at least one group of publish/subscribe engines, wherein the group is a subset of the set of publish/subscribe engines, wherein the group provides a function that can be carried out by any one of the publish/subscribe engines associated with the group;
receiving at the publish/subscribe engines not associated with the group a group proxy subscription from each one of a group of publish/subscribe engines, wherein the group proxy subscription comprises a topic, an indication of the publish/subscribe engine sending the group proxy subscription, and an indication of the group;
receiving at each of the set of publish/subscribe engines an individual proxy subscription from each one of a group of publish/subscribe engines, wherein the individual proxy subscription comprises a topic and an indication of the publish/subscribe engine sending the individual proxy subscription and excludes the indication of the group;
responsive to at least one of the group of publish/subscribe engines receiving from the publish/subscribe engines not associated with the group a publish message for the topic associated with at least one of the individual proxy subscription and the group proxy subscription, canting out the function with respect to private subscribers of the one of the group of publish/subscribe engines and, responsive to the publish message being associated with the group proxy subscription, forwarding the publish message to at least one other of the publish/subscribe engines associated with the group of publish/subscribe engines; and
wherein the group of publish/subscribe engines comprises a gateway group within a first collective for connection to a second collective, and the function comprises linking the first and second collectives.

9. An apparatus for message delivery in a publish/subscribe network, comprising:
a processor;
a first module for controlling the processor for defining a group of publish/subscribe engines as a subset of a set of fully connectable publish/subscribe engines, wherein the group is operable to provide a function which can be carried out by any one of the publish/subscribe engines associated with the group;
a second module for controlling the processor for controlling each of the publish/subscribe engines associated with the group to send a group proxy subscription to the publish/subscribe engines not associated with the group, the group proxy subscription comprising a topic, an indication of the publish/subscribe engine sending the group proxy subscription, and an indication of the group;
a third module for controlling the processor for controlling each of the publish/subscribe engines associated with the group to send an individual proxy subscription to the set of publish/subscribe engines, the group proxy subscription comprising a topic anti an indication of the publish/subscribe engine sending the group proxy subscription and excluding the indication of the group; and
wherein the group of publish/subscribe engines comprises a gateway group within a first collective for connection to a second collective, and the function comprises linking the first and second collectives.

10. A system for message delivery in a publish/subscribe network, comprising:
a plurality of publish/subscribe engines definable as a group, the plurality of publish/subscribe engines being a subset of a set of fully connectable publish/subscribe engines, and wherein the group is operable to provide a function which can be carried out by any one of the publish/subscribe engines associated with group of publish/subscribe engines;
each of the publish/subscribe engines associated with group of publish/subscribe engines comprising:
means for sending a group proxy subscription to at least one publish/subscribe engine not associated with the group, the group proxy subscription comprising a topic, an indication of the publish/subscribe engine sending the group proxy subscription, and an indication of the group of publish/subscribe engines,
means for sending an individual proxy subscription to the set of publish/subscribe engines, the individual proxy subscription comprising a topic and an indication of the publish/subscribe engine sending the group proxy subscription and excluding the indication of the group; and wherein the group of publish/subscribe engines comprises a gateway group within a first collective for connection to a second collective, and the function comprises linking the first and second collectives.

11. The system as claimed in claim 10, wherein the publish/subscribe engine not associated with the group comprises:
   means for receiving group proxy subscription for a topic from each publish/subscribe engine in a group; and
   means for sending a publish message to one of the group of publish/subscribe engines with a group proxy subscription for a topic.

12. The system as claimed in claim 10, wherein the publish/subscribe engine not associated with the group further comprising:
   means for determining if the one of the group of publish/subscribe engines to which the publish message is being sent also has an individual proxy subscription; and
   means for including the publish message for the group in the publish message for the individual proxy subscription.

13. The system as claimed claim 10, wherein a publish message is operable to identity a destination of one of: an individual publish/subscribe engine, a group of publish/subscribe engines, or both an individual publish/subscribe engine and a group of publish/subscribe engines.

14. The system as claimed in claim 13, wherein a publish/subscribe engine for the group comprises: means for determining a destination identified in a publish message as a group of publish/subscribe engines; and means for carrying out the function of the group.

15. The system as claimed in claim 10, wherein the group of publish/subscribe engines comprises a queue sharing group with a shared queue within a collective, and the function comprises sending the publish message from the shared queue to a subscriber.

16. A non-transitory computer-readable storage medium having stored therein computer-readable instructions, which, when loaded in and executed by a computer causes the computer to perform the steps of:
   defining a group of publish/subscribe engines, wherein the group is a subset of a, set of fully connectable publish/subscribe engines, wherein the group provides a function which can be carried out by any one of the publish/subscribe engines associated with the group;
   each of the publish/subscribe engines associated with the group sending a group proxy subscription to the publish/subscribe engines not associated with the group, the group proxy subscription comprising a topic, an indication of the publish/subscribe engine sending the group proxy subscription, and an indication of the group;
   each of the publish/subscribe engines associated with the group sending an individual proxy subscription to the set of publish/subscribe engines, the individual proxy subscription comprising a topic and an indication of the publish/subscribe engine sending the individual proxy subscription and excluding the indication of the group; and
   wherein the group of publish/subscribe engines comprises a gateway group within a first collective for connection to a second collective, and the function comprises linking the first and second collectives.

17. The non-transitory computer-readable storage medium of claim 16, wherein, responsive to a publish/subscribe engine not associated with the group sending a publish message for a topic to one of the group of publish/subscribe engines in response to one of an individual proxy subscription for the topic and a group proxy subscription for a topic, the one of the group of publish/subscribe engines carrying out the function with respect to private subscribers of the one of the group of publish/subscribe engines.

18. The non-transitory computer-readable storage medium of claim 17, wherein, responsive to a the publish message being in response to the group proxy subscription for the topic, forwarding the publish message to other ones of the group of publish/subscribe engines associated with an individual proxy subscription for the topic at the one of the group of publish/subscribe engines.

19. The non-transitory computer-readable storage medium of claim 18, wherein the publish message identifies a destination of one of: an individual publish/subscribe engine, a group of publish/subscribe engines, or both an individual publish/subscribe engine and a group of publish/subscribe engines.

20. The non-transitory computer-readable storage medium of claim 19, wherein a publish/subscribe engine receiving a publish message with a destination identified as a group of publish/subscribe engines carries out the function of the group.

21. The non-transitory computer-readable storage medium of claim 16, wherein the group of publish/subscribe engines comprises a queue sharing group with a shared queue within a collective, and the function comprises sending the publish message from the shared queue to a subscriber.

22. The non-transitory computer-readable storage medium of claim 16, wherein the group of publish/subscribe engines comprises a gateway group within a first collective for connection to a second collective, and the function comprises linking the first and second collectives.

23. The non-transitory computer-readable storage medium of claim 16, wherein a proxy subscription is sent from a publish/subscribe engine to other publish/subscribe engines to inform the other publish/subscribe engines that if they receive a publish message for the topic associated with the proxy subscription, they should forward it to the publish/subscribe engine sending the proxy subscription.

24. The non-transitory computer-readable storage medium of claim 16, wherein a group proxy subscription is sent from each one of a group of publish/subscribe engines to publish/subscribe engines not associated with the group, to inform the publish/subscribe engines not associated with the group that if they receive a publish message for the topic associated with the proxy subscription, they should forward it to one of the publish/subscribe engines associated with group.

25. A non-transitory computer-readable storage medium having stored therein computer-readable instructions, which, when loaded in and executed by a computer causes the computer to perform the steps of:
   receiving a group proxy subscription from each one of a group of publish/subscribe engines, wherein the group proxy subscription comprises a topic, an indication of the publish/subscribe engine sending the group proxy subscription, and an indication of the group;
   receiving a publish message for the topic associated with the group proxy subscription;
   and forwarding the publish message to one of the publish/subscribe engines associated with the group of publish/subscribe engines; and
   wherein the croup of publish/subscribe engines comprises a gateway group within a first collective for connection to a second collective, and the function comprises linking the first and second collectives.

* * * * *